(12) United States Patent
Min

(10) Patent No.: US 6,819,676 B1
(45) Date of Patent: Nov. 16, 2004

(54) METHOD FOR IMPROVING SCHEDULING FAIRNESS OF SIGNAL TRANSMISSION/RECEPTION IN A NETWORK

(75) Inventor: Kyung Pa Min, Seoul (KR)

(73) Assignee: Hyundai Electronics Industries Co., Ltd., Kyounggi-Do (KR)

( * ) Notice: Subject to any disclaimer, the term of this patent is extended or adjusted under 35 U.S.C. 154(b) by 0 days.

(21) Appl. No.: 09/427,754

(22) Filed: Oct. 27, 1999

(30) Foreign Application Priority Data

Dec. 18, 1998 (KR) .......................................... 98-56110

(51) Int. Cl.⁷ .......................................... H04L 12/413
(52) U.S. Cl. ...................... 370/448; 370/447; 370/458; 370/445
(58) Field of Search ................................ 370/448, 462, 370/445, 447, 446, 449, 458; 709/235, 225, 253, 238; 710/26, 36; 714/749

(56) References Cited

U.S. PATENT DOCUMENTS

| | | | | |
|---|---|---|---|---|
| 5,436,903 A | | 7/1995 | Yang et al. | |
| 5,526,355 A | | 6/1996 | Yang et al. | |
| 5,650,997 A | * | 7/1997 | Yang et al. | 370/448 |
| 5,852,723 A | * | 12/1998 | Kalkunte et al. | 709/235 |
| 5,894,559 A | * | 4/1999 | Krishna et al. | 709/253 |
| 5,936,962 A | * | 8/1999 | Haddock et al. | 370/446 |
| 5,940,399 A | * | 8/1999 | Weizman | 370/445 |
| RE36,353 E | * | 10/1999 | Yang et al. | 370/448 |
| 5,963,560 A | * | 10/1999 | Kalkunte | 370/448 |
| 5,978,385 A | * | 11/1999 | Haddock et al. | 370/446 |
| 5,999,538 A | * | 12/1999 | Haddock et al. | 370/446 |
| 6,055,578 A | * | 4/2000 | Williams et al. | 709/253 |
| 6,078,591 A | * | 6/2000 | Kalkunte et al. | 370/448 |
| 6,205,153 B1 | * | 3/2001 | Shaffer et al. | 370/445 |
| 6,522,661 B1 | * | 2/2003 | Min | 370/445 |

* cited by examiner

Primary Examiner—Wellington Chin
Assistant Examiner—Chuong Ho
(74) Attorney, Agent, or Firm—Fleshner & Kim, LLP

(57) ABSTRACT

A method for improving scheduling fairness in using a network may include detecting whether or not a collision occurs during packet transmission in the network having a plurality of nodes; and storing and monitoring signal transmit/receive states before the collision with respect to each of the plurality of nodes; if the collision is detected, reading the previous transmit/receive states with respect to a node having the collision. The previous node state that has been read is judged and newly setting an inter packet gap (IPG) for the node. After waiting for a lapse of the IPG that has been set, a backoff is effected. After waiting for a lapse of the backoff time, a signal of the node that has been collided is retransmitted, and the status of the retransmitted signal of the node is analyzed to determine if the retransmitted signal collided. If the collision is not detected with respect to the retransmitted signal of the node, the signal transmit/receive state of the node is updated. If the collision is detected with respect to the retransmitted signal of the node, the steps of reading and judging the previous node state, newly setting the IPG, effecting the backoff time, retransmitting the signal, and again detecting a collision is repeated.

26 Claims, 5 Drawing Sheets

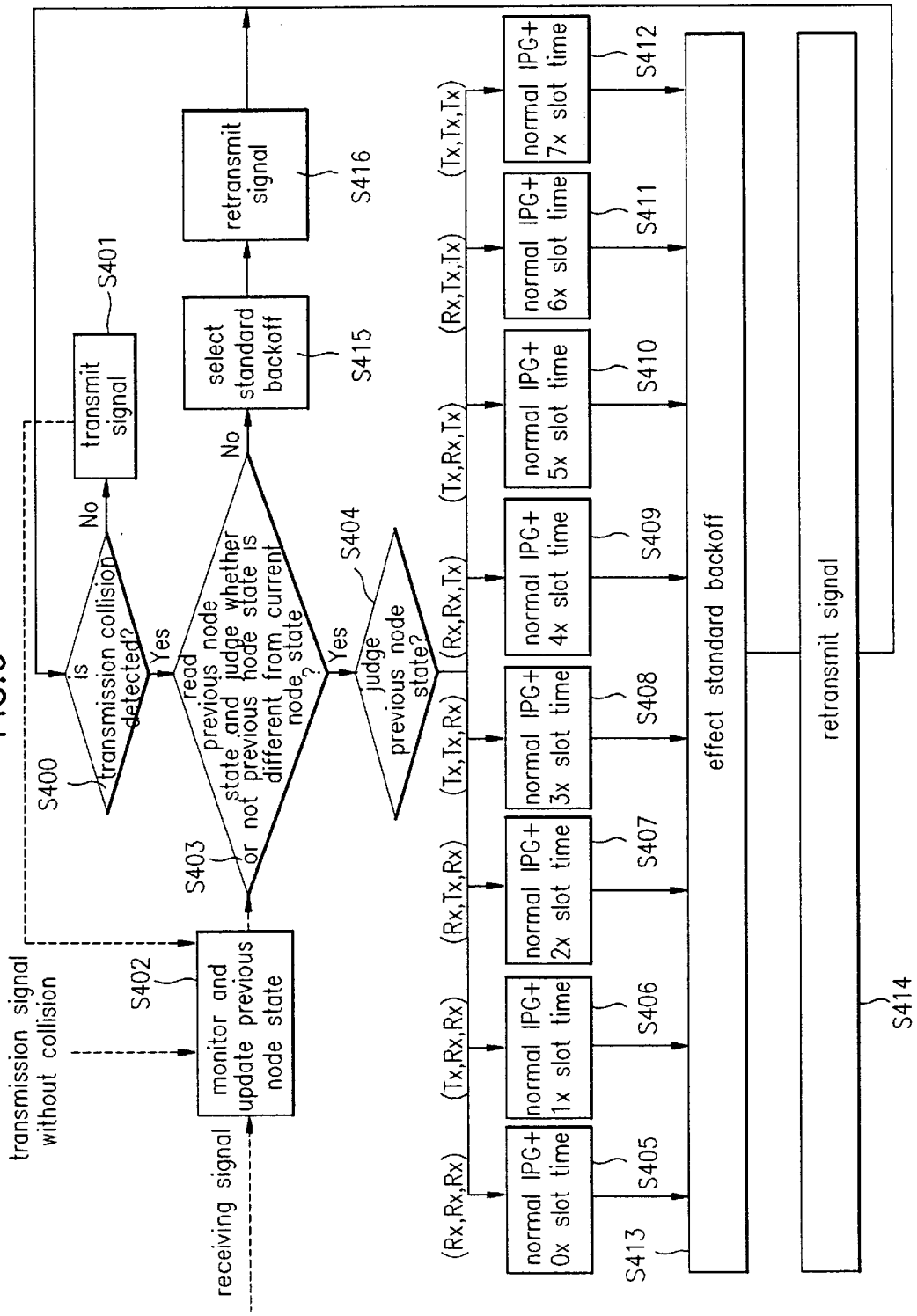

METHOD FOR IMPROVING SCHEDULING FAIRNESS OF SIGNAL TRANSMISSION/RECEPTION IN A NETWORK

BACKGROUND OF THE INVENTION

1. Field of the Invention

The present invention relates to a local area network (LAN) employing the Ethernet and more particularly to a method for improving scheduling fairness of signal transmission/reception in a network when collisions occur in an Ethernet based LAN.

2. Background of the Related Art

Generally, all nodes can access a network with fair scheduling priority in a CSMA/CD (Carrier Sense Multiple Access with Collision Detection) system. All the nodes must confirm that the network is not used for a time interval of an inter packet gap (IPG) before transmitting a packet. The IPG is typically about 9.6 $\mu$s for a 10M network and 0.96 $\mu$s at a 100M network. However, a collision occurs when two nodes transmit a packet simultaneously.

FIG. 1 illustrates channel access processing in a conventional Ethernet based LAN. As shown in FIG. 1, all m nodes, from the first node $S_1$, to the mth node $S_m$, transmit a first packet. After the transmission is completed, the nodes $S_1$ to $S_m$ wait for up to the IPG duration before transmitting a second packet. After the transmission of the second packet is completed, the first node $S_1$ to the next to last node $S_m$ wait for the IPG and then transmit a third packet. However, the mth node $S_m$ delays for the IPG after finishing the transmission of the second packet and then transmits a fourth packet. If the first node $S_1$ and the mth node $S_m$ simultaneously transmit their packets, then a conflict or collision occurs after ½ slot time. In FIG. 1, a collision occurs between the fourth packets transmitted from nodes $S_1$ and $S_m$.

If the collision occurs, each node that transmitted the colliding packets waits as long as the IPG plus a backoff time before retransmitting the same packet. The backoff time is set differently for each node to prevent another collision. Each node that transmits a colliding packet repeats the transmission immediately after a lapse of the predetermined backoff time until the packet is successfully transmitted or until the number of retransmission trials or attempts due to collisions exceeds a predetermined maximum number and the trial terminates.

One related process for setting the backoff time is called a truncated binary exponential backoff algorithm. FIG. 2 illustrates a channel capture effect occurring when using such a related backoff algorithm. The backoff time is set to an integral multiple number r of a slot time. The slot time is a maximum turnaround time delay in the network. In other words, the time slot is a maximum time necessary for a certain node to transmit a packet and receive an answer. For example, the slot time in a 10M network is 51.2 $\mu$s.

The integral multiple number r that will be multiplied by the slot time is determined based on the number of times the packet is retransmitted by the node in accordance with the following formula:

$0 \leq r < 2^k$, where variable k=min (n, 10), n is the number of times of signal retransmission and 10 is the predetermined maximum number of retransmission attempts before the trial terminates.

Table 1 illustrates the values of the integral multiple number r and available backoff times based on the number of times of signal retransmission n.

TABLE 1

| number of times of retransmission | r | backoff time (rx slot time) |
|---|---|---|
| 1 | 0,1 | 0x slot time, 1x slot time |
| 2 | 0,1,2,3 | . |
| 3 | 0,1,2,3,4,5,6,7 | . |
| 4 | 0~15 | 0x slot time~15x slot time |
| . | . | . |
| . | . | . |
| . | . | . |
| 10 | 0~1023 | 0x slot time~1023x slot time |

For example, the number of retransmissions n varies form 1 through 10. When the number of retransmissions n is 1, namely, at the first retransmission, variable k=min(1, 10)=1 and $0<r<2^1$. Therefore, the integral multiple number r may be 0 or 1. Based on the selected value of the integral multiple number r the backoff time may be 0 times the slot time or 1 times the slot time.

At the 10th retransmission, variable k=min(10,10)=10 and $0<r<2^{10}$, so the integral multiple number r may be one of 0 to 1023. Therefore, the backoff time may be one of 0 times the slot time to 1023 times the slot time based on the selected integral multiple number r value optionally selected. At this time, the slot time in the 10M network is 52.4 ms.

If such method as described above is applied to a network having many nodes, some amount of scheduling fairness could be realized. The following description referring to FIG. 2 concerns the case that signals are transmitted in the related method in a network having a few active nodes. FIG. 2 illustrates a channel capture effect occurring when using a related backoff algorithm.

If the node A and the node B perform transmission of a packet at the same time, a collision of the packets occur. If the collision occurs, each of the nodes A and B determines a backoff time. If respective integral multiple number r values of nodes A and B are set to 0 and 1 respectively, the backoff time of node A becomes 0x slot time, and the backoff time of node B becomes 1x slot time. Accordingly, node A transmits a signal after waiting for only an IPG while node B waits for IPG +1x slot time until the node A completes the packet transmission. Then node B waits for another IPG before transmitting its signal. According to such a scheme, node A can successfully transmit its packet without interference from node B.

Afterwards, if node A tries to successively transmit another packet, the packet collides with the first packet transmitted from node B. For node A which successfully transmitted its previous packet, this collision is the first collision for the successive packet, but the collision is the second collision for the first packet transmitted from node B. In other words, the number of times of signal retransmission, n, by the node A is less than the number of times of signal retransmission, n, by the node B. Therefore, there is low probability that the backoff time of node A is longer than the backoff time of node B. That is, the probability that node A can use the network is higher than the probability that node B can use the network. A problem exists that node A continuously transmits its packets while node B must only wait. This channel capture effect is more common when the conventional packet transmission method is applied to the LAN having a few active nodes.

Accordingly, when the related method is applied to a network having a few active nodes, there occurs the channel capture effect that one node must continuously wait while another node can continuously transmit packets, thus decreasing scheduling fairness of the network.

SUMMARY OF THE INVENTION

An object of the present invention is to substantially obviate one or more of the limitations and disadvantages of the related art.

Another object of the present invention is to improve scheduling fairness in using a network when collisions in an Ethernet based LAN occur during signal transmission.

A further object of the present invention is to increase overall network use efficiency.

To achieve these and other advantages, and in accordance with the purpose of the present invention as embodied and broadly described, a method for improving scheduling fairness for a network in accordance with a preferred embodiment of the invention includes detecting a packet collision occurring while different nodes transmit a packet; reading a previous network state for application of the backoff algorithm; selecting a new IPG based upon the read information; and determining a backoff time before retransmitting a packet.

The present invention can be achieved in a whole or in parts by a method for improving scheduling fairness in using a network by detecting whether or not collision occurs during packet transmission in the network having a plurality of nodes, and storing and monitoring signal transmit/receive state of X bit(s) before the collision with respect to each of the plurality of nodes. If the collision is detected, reading the previous transmit/receive state of X bit(s) with respect to a node having the collision, and judging the previous node state that has been read and setting an inter packet gap (IPG) for the node. After lapse of the IPG that has been set, effecting standard backoff. After lapse of a corresponding backoff time, retransmitting a signal of the node that has been collided. Detecting transmission collision with respect to the retransmitted signal of the node. If the collision is not detected with respect to the retransmitted signal of the node, updating the signal transmit/receive state of the node. If the collision is detected with respect to the retransmitted signal of the node, then repeating the steps of reading and judging previous node state, setting the IPG, effecting the standard backoff, retransmitting the signal, and detecting the collision.

The present invention can also be achieved in a whole or in parts by a method for scheduling transmissions from a plurality of nodes, including receiving a status of the node indicative of the successful transmission of a previous packet from the node; setting a length of time based on the status of the node; and transmitting a current packet to a system after waiting for the length of time.

The present invention can also be achieved in whole or in parts by a method for scheduling transmissions from a plurality of nodes, including detecting whether a collision occurs between transmitted signal during packet transmission in a network having a plurality of nodes. If the collision is not detected, transmitting a signal and updating the node state. If the collision is detected, reading a signal transmit/receive state of a node having the collision, and judging whether there is a difference between the signal transmit/receive state and a current state of the corresponding node. If there is no difference between the signal transmit/receive state and the current state, then retransmitting the signal after a backoff time, and detecting whether another collision occurs. If there is a difference between the signal transmit/receive state and the current states then setting an inter packet gap for the node based on the signal transmit/receive state. After a lapse of the inter packet gap and the backoff time, retransmitting the signal from the node having the collision and detecting whether a collision of the signal retransmitted from the node occurs. If the collision is not detected with respect to the retransmitted signal, updating the signal transmit/receive state of the node having the collision. If the collision is detected with respect to said retransmitted signal, and if there is no difference between the signal transmit/receive state and the current node state, then repeating step (d).

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 6 is a flow chart showing an application of the method for improving scheduling fairness for a network according to the second embodiment of the present invention.

DETAILED DESCRIPTION OF PREFERRED EMBODIMENTS

The present invention relates to a method for improving overall scheduling fairness for a network by changing an IPG of each node according to a previous network use state of each node when a collision occurs among multiple nodes during packet transmission. The system for improving scheduling fairness in using a network according to the first embodiment of the present invention uses the previous two-bit transmit/receive states of each node.

Figure 1:
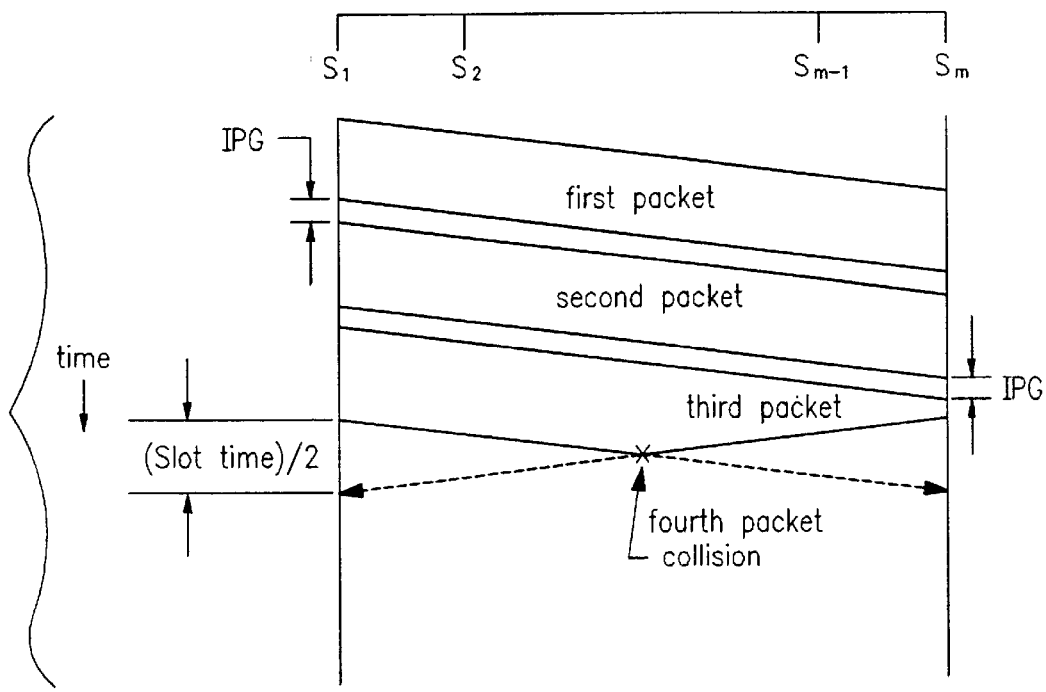
FIG. 1 illustrates a channel access process in an Ethernet based LAN according to conventional technology.
Figure 2:
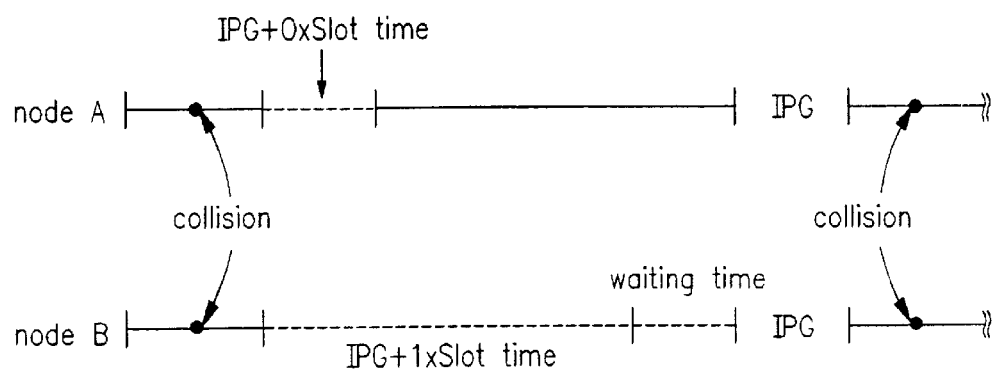
FIG. 2 illustrates a channel capture effect that occurs when using a conventional standard backoff algorithm.
Figure 3:
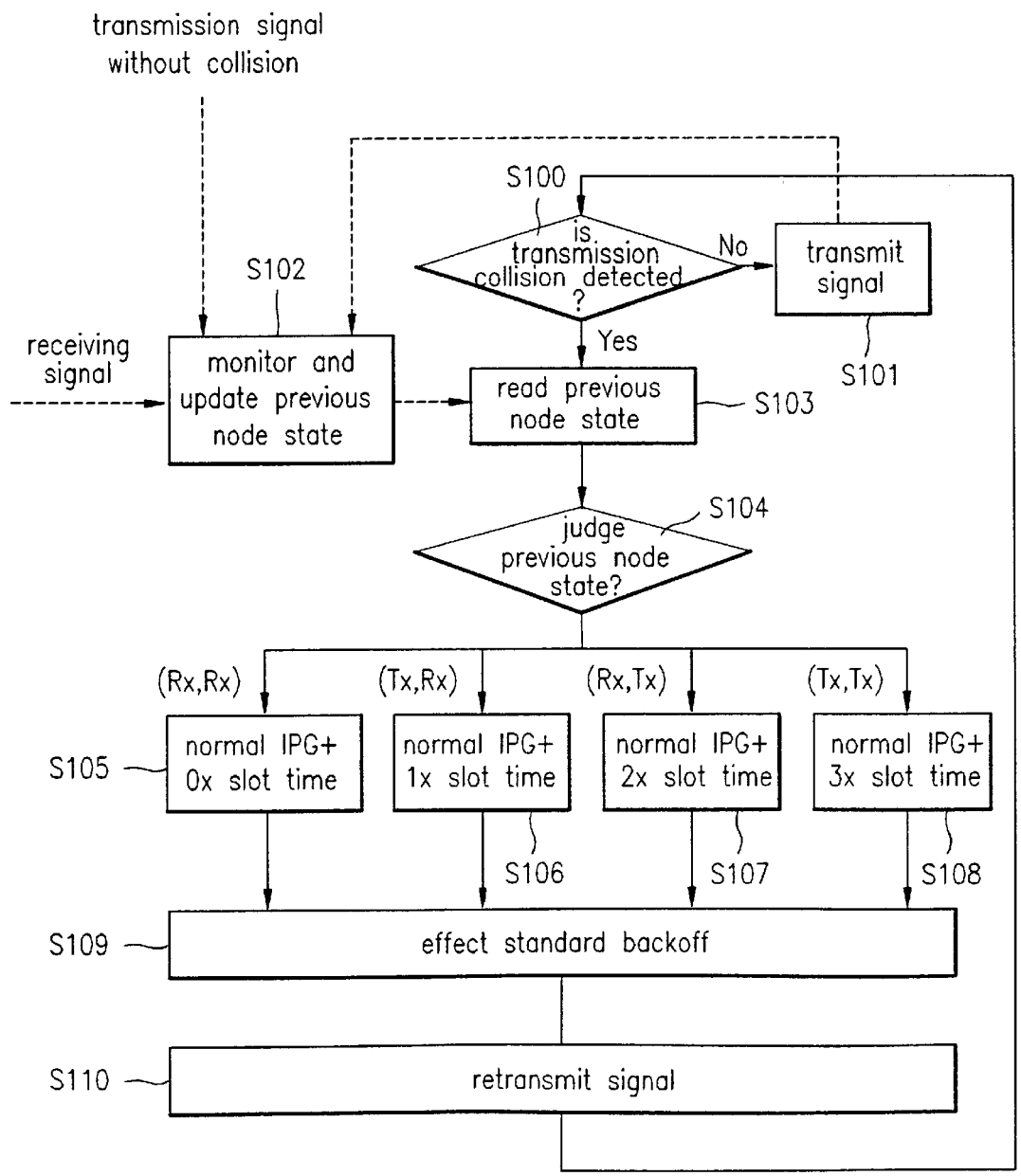
FIG. 3 is a flow chart showing a method for improving scheduling fairness for a network according to a first embodiment of the present invention.

As shown in FIG. 3, a receiver state indicates that an attempted transmission was unsuccessful. At step S100, the system detects a collision occurring while each node transmits a packet. If no collision occurs, then at step S101, the system transmits a signal and, at step S102, updates the node state.

If a collision occurs, then at step S103, the previous two-bit network state of a node having the collision is read. At step S104, the node state that has been read is then judged to select a new IPG. The newly selected IPG corresponding to each node state is set.

If the previous node state is reception Rx after reception Rx, (namely, (Rx, Rx)), then the node has not successfully transmitted its packet during the two previous trials. At step S105 of FIG. 3, the new IPG is set to "normal IPG+0× slot time", where the normal IPG is predetermined, and the corresponding node has a high transmission priority and waits for the new IPG before retransmitting the packet. If the previous node state is reception Rx after transmission Tx (namely, (Tx, Rx)), then the node successfully transmitted a previous packet, but failed to transmit during the node's last trial. The new IPG is set to "normal IPG+1× slot time" and the corresponding node has a medium-high transmission priority and waits as long as the new IPG before retransmitting the packet.

If the previous node state is transmission Tx after reception Rx (namely, (Rx, Tx)), then the node successfully transmitted the previous packet after failing to transmit in its earlier previous trial. The new IPG is set to "normal IPG+2× slot time" and the corresponding node has a medium-low transmission priority, and waits as long as the new IPG before transmitting a new packet. If the previous node state is transmission Tx after transmission Tx (namely, (Tx, Tx)), then the node successfully transmitted its two preceding packets during the two previous trials. The new IPG is set to "normal IPG+3× slot time" and the corresponding node has a low priority and waits as long as the new IPG before transmitting a new packet.

As illustrated in FIG. 3, if a collision occurs when a node transmits a signal, a new IPG is set according to the previous node states having two bits. If the node is judged to carry out only reception twice based upon the previous node states, the new IPG is set to be shorter to increase probability of the signal or packet being transmitted successfully. On the other hand, if the node is judged to carry out only transmission twice based upon the previous node states, the new IPG is set to be longer to decrease the probability of the signal or packet being transmitted successfully.

Once the new IPG is set to one of the above four time values according to the four cases of the node states, the corresponding node waits for up to the newly set IPG. Then, at step S109, the standard backoff is effected, so the node further waits for up to the corresponding backoff time before retransmitting the signal at step S110. Afterwards, steps S100 to S110 are repeated. In other words, the system repeats the steps of detecting whether a collision occurs during the transmission at step S100. If no collision is detected, the system transmits the signal at step S101 and updates the node state at step S102. If a collision is detected, the system reads the node state at step S103, judges the node state at step S104, newly sets the IPG at steps S105 to S108, effects the standard backoff (S109), and retransmits the signal at step S110.

The backoff time is decided in accordance with the following formula:

$0 \leq r < 2^k$, where variable k=min(n, 10), and the number of retransmissions n is the number of times of signal retransmission. Backoff times according to values of the number of retransmissions n are illustrated in Table 1. Any one of the integral numbers in a given range can be optionally selected as the integral multiple number r.

In summary, when a packet at each node is transmitted through such a method as described by example above, the overall waiting time is as follows. Primarily, if the previous node state is (Rx, Rx), the waiting time is "normal IPG+0× slot time+r× slot time". If the previous node state is (Tx, Rx), the waiting time is "normal IPG+1× slot time+r× slot time". If the previous node state is (Rx, Tx), the waiting time is "normal IPG+2× slot time+r× slot time". If the previous node state is (Tx, Tx), the waiting time is "normal IPG+3× slot time+r× slot time".

Figure 4:
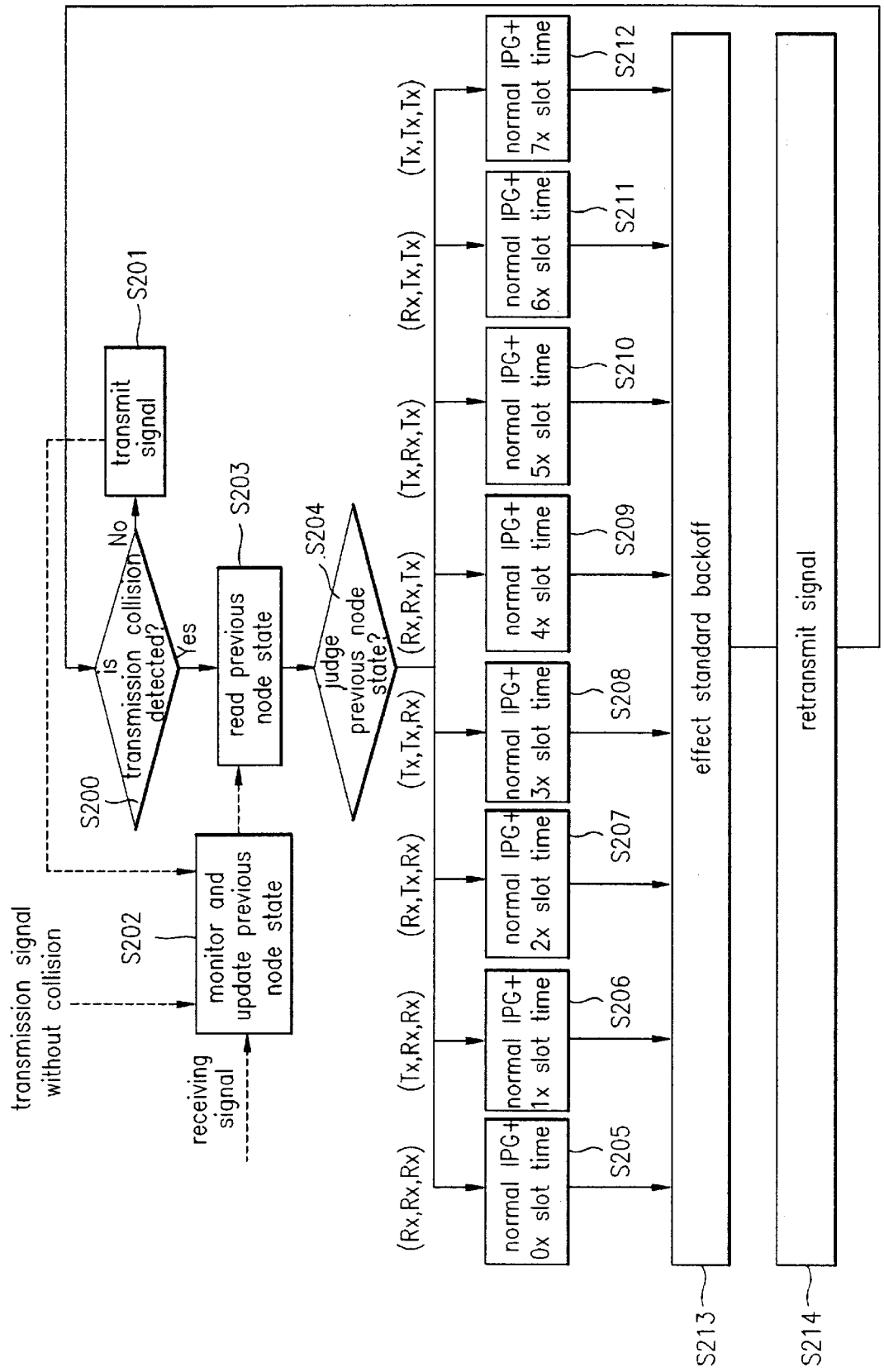
FIG. 4 is a flow chart showing an application of the method for improving scheduling fairness for a network according to the first embodiment of the present invention.

The following description refers to FIG. 4 and concerns an example method for improving scheduling fairness in using a network where the first embodiment of the present invention is applied. In this application illustrated in FIG. 4, previous transmit/receive states of a node are read up to three bits representing the three previous trials or states. A new IPG is set according to the three previous node states.

As shown in FIG. 4, the steps of: detecting transmission collision, step S200; transmitting a signal if no collision is detected, step S201; monitoring and updating the previous node state, step S202; reading and judging the node state if any collision is detected, steps S203 and S204 to newly set an IPG, are the same as in the first embodiment of the present invention as show in FIG. 3, and are therefore not discussed again to avoid repetition. The method illustrated in FIG. 4 is different from the first embodiment because it uses the three previous node states represented by three bits, thus increasing the number of available selections for the new IPG up to $2^3$.

Specifically, if the previous node states are (Rx, Rx, Rx), the new IPG is set to "normal IPG+0× slot time" at step S205. If thee previous node states are (Tx, Rx, Rx), the new IPG is set to "normal IPG+1× slot time" at step S206. If the previous node states are (Rx, Tx, Rx), the new IPG is set to "normal IPG+2× slot time" at step S207. If the previous node states are (Tx, Tx, Rx), the new IPG is set to "normal IPG+3× slot time" at step S208. If the previous node states are (Rx, Rx, Tx), the new IPG is set to "normal IPG+4× slot time" at step S209. If the previous node states are (Tx, Rx, Tx), the new IPG is set to "normal IPG+5× slot time" at step S210. If the previous node states are (Rx, Tx, Tx), the new IPG is set to "normal IPG+6× slot time" at step S211. If the previous node states are (Tx, Tx, Tx), the new IPG is set to "normal IPG+7× slot time" at step S212. Each node waits as long as its corresponding new IPG as set in steps S205 to S212, plus a standard backoff time as effected in step S213 and then retransmits the signal or packet at step S214.

The steps S200 to S214 are continuously repeated until the signal or packet is successfully transmitted. In other words, the scheduling approach enables the network for repeatedly detecting whether or not there occurs the collision during the transmission at step S200; transmitting the signal at step S201 and updating the node state at step S202 if no collision is detected; reading and judging the previous node states at steps S203 and S204 if the collision is detected; newly setting the IPG and waiting up to the duration of the new IPG at steps S205 to 212, effecting the standard backoff, and waiting up to the duration of the backoff time at step S213, and retransmitting the signal at step S214.

The second embodiment of the present invention will now be described with reference to FIGS. 5 and 6. A method for improving scheduling fairness in using a network according to the second embodiment of the present invention uses previous transmit/receive node states of two or more bits as previously discussed. At step S300, the network or system, as instructed by the method, detects if a collision occurred while each node transmits a packet. If there is no collision between packets, then at step S301, a signal is transmitted, and at step S302, the node state is updated.

If a collision is detected, then the system reads the previous network states of the nodes having the collision, as in step S103, and determines whether the current node state is the same as the previous node state at step S303. At step S304, the system judges the previous node state to set a new IPG. After reading and judging the previous node state, the new IPG is set according to the node state.

If the previous node state is reception Rx after reception Rx (namely, (Rx, Rx)), then at step S305, the new IPG is set to "normal IPG+0× slot time", where the normal IPG is predetermined, and a corresponding node waits up to the duration of the new IPG before retransmitting. If the previous node state is reception Rx after transmission Tx (namely, (Tx, Rx)), then at step S306, the new IPG is set to "normal IPG+1× slot time" and a corresponding node waits up to the duration of the new IPG before retransmitting. If the previous node state is transmission Tx after reception Rx (namely, (Rx, Tx)), then at step S307 the new IPG is set to "normal IPG+2× slot time" and a corresponding node waits up to the duration of the new IPG before retransmitting. If the previous node state is transmission Tx after transmission Tx (namely, (Tx, Tx)), then at step S308, the new IPG is set to "normal IPG+3× slot time" and a corresponding node waits up to the duration of the new IPG before retransmitting.

Figure 5:
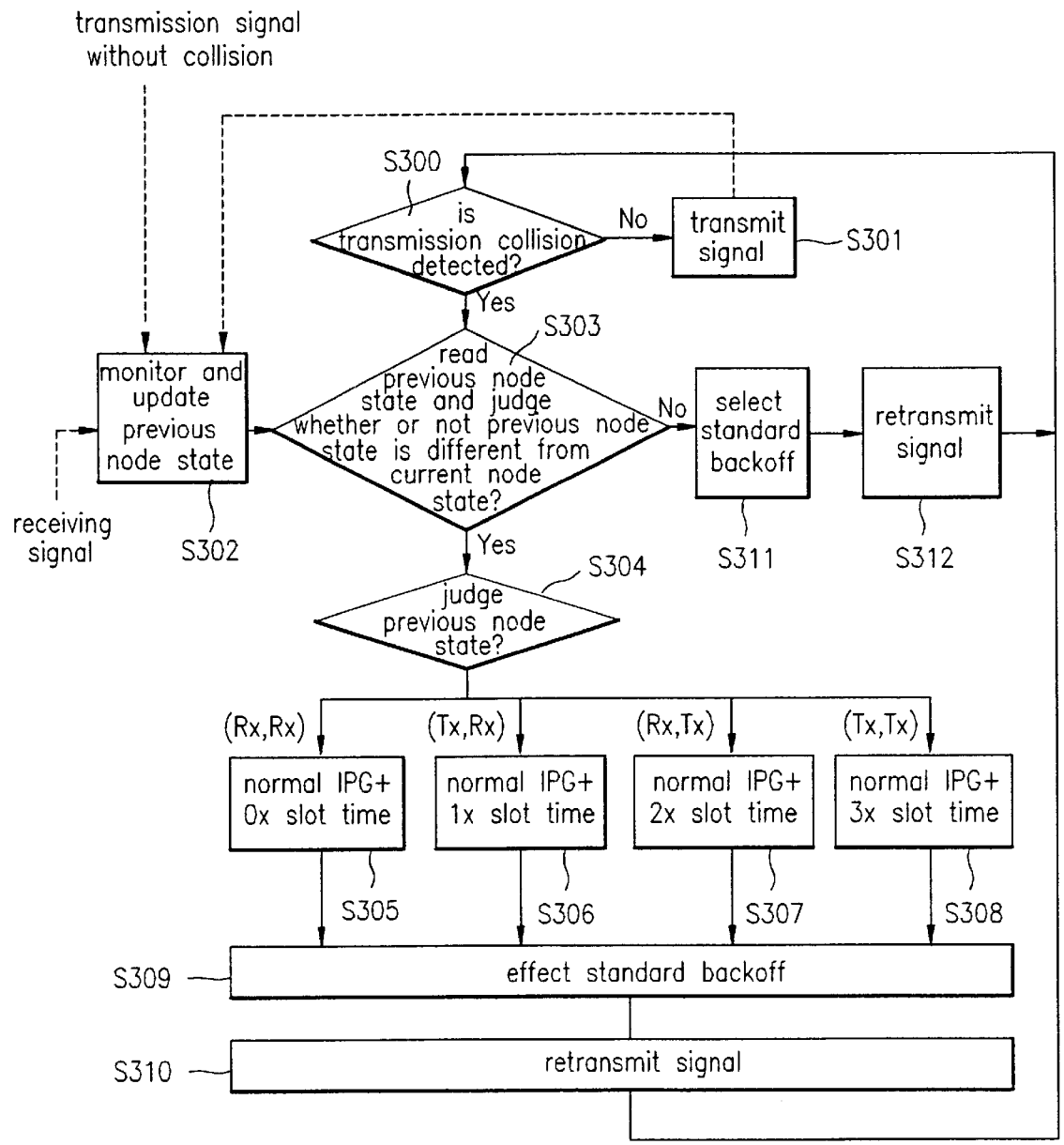
FIG. 5 is a flow chart showing a method for improving scheduling fairness for a network according to a second embodiment of the present invention.

As illustrated in FIG. 5, a new IPG is set according to the previous transmit/receive node states (of two bits) before the current state having the collision. If the node is judged to carry out only reception twice from the previous node states, the new IPG is set to be shorter to increase probability of a signal or packet being transmitted successfully. On the other hand, if the node is judged to carry out only transmission twice based on the previous two node states, the new IPG is set to be longer to decrease the probability of a signal or packet being transmitted successfully.

Once the new IPG is set to one of the above four time values according to the four cases of the node states, the corresponding node waits for up to the newly set IPG. Then at step S309, the standard backoff is effected, so the node further waits for up to a corresponding backoff time before retransmitting the signal at step S310. Afterwards steps S300 to S312 are repeated. In other words, the system repeats the steps of detecting whether the collision occurs during the transmission at step S300; transmitting a signal at step S301 and updating the node state at step S302 if no collision is detected; and reading the previous node states and judging whether the current node state is different from the read previous node state at step S303 if the collision is detected. If the previous and current node states are different, then steps S304 to S310 are repeated as described above. If there is no difference between the current node state and the previous node state, a standard backoff method is selected at step S311 and a backoff time is newly determined. After a lapse of the backoff time, the signal is retransmitted at step S312. Subsequently, the step S300 of detecting the collision is again repeated.

The standard backoff time is decided in accordance with the following formula:

$0 < r < 2^k$, for variable $k = \min(n, 10)$, wherein the number of retransmissions n is the number of times of signal retransmission. Waiting times according to values of the number of retransmissions n are illustrated above in Table 1. One of the integral figures in a given range can be optionally selected as the integral multiple number r.

The following description refers to FIG. 6 and concerns an example method for improving scheduling fairness in using a network where the second embodiment of the present invention is applied.

The steps of detecting transmission collision at step S400, transmitting the signal at step S401, updating the previous node state at step S402, reading the previous state and determining whether it is different than the current node state at step S403, selecting the standard backoff at step S415, retransmitting the signal or packet at step S416, and judging the previous node state at step S404 in the applied method shown in FIG. 6 are the same as the corresponding steps in the second embodiment of the present invention shown in FIG. 5 and are therefore not discussed again to avoid repetition. The method illustrated in FIG. 6 is different from the second embodiment because it uses the previous node states represented by three bits before collision occurs, thus increasing the number of available selections for the new IPG up to $2^3$.

Specifically, if the previous node states are (Rx, Rx, Rx), the new IPG is set to "normal IPG+0× slot time" at step S405. If the previous node states are (Tx, Rx, Rx), the new IPG is set to "normal IPG+1× slot time" at step S406. If the previous node states are (Rx, Tx, Rx), the new IPG is set to "normal IPG+2× slot time" at step S407. If the previous node states are (Tx, Tx, Rx), the new IPG is set to "normal IPG+3× slot time" at step S408. If the previous node states are (Rx, Rx, Tx), the new IPG is set to "normal IPG+4× slot time" at step S409. If the previous node states are (Tx, Rx, Tx), the new IPG is set to "normal IPG+5× slot time" at step S410. If the previous node states are (Rx, Tx, Tx), the new IPG is set to "normal IPG+6× slot time" at step S411. If the previous node states are (Tx, Tx, Tx), the new IPG is set to "normal IPG+7× slot time" at step S412. Each node waits as long as its corresponding new IPG as set in steps S405 to S412 plus the standard backoff time as selected by the standard backoff method at step S413. Accordingly, the node waits for the additional backoff time before retransmitting the signal at step S414.

The steps S400 to S416 are continuously repeated until the signal or packet is successfully transmitted. In other words, whether or not there occurs the collision during the transmission is detected at step S400. If no collision is detected, a signal is transmitted at step S401 and the node state is updated at step S402. If the collision is detected, the previous node state is read and compared to the current node state at step S403. If there is no change in the node state, the standard backoff method is selected at step S415 and a backoff time is newly set. After a lapse of the backoff time, the signal is retransmitted at step S416.

Accordingly, the present invention can reduce the channel capture effect by newly setting the IPG in a small scale network having a few active nodes, thus improving the scheduling fairness in using the network and increasing use efficiency on the network.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for scheduling transmission from a plurality of nodes, comprising:
   (a) receiving a status of the node having two or more bits indicative of a successful or failed transmission during at least two previous transmission attempts from the node;
   (b) setting a length of time based on success or failed status having two or more bits; and (c) transmitting a current packet to a system after waiting for the length of the time.

2. The method of claim 1, further comprising:
(d) detecting whether a collision of the current packet transmitted from the node to the system occurred before receiving the status in step (a).

3. The method of claim 2, further comprising:
repeating steps (a–d) up to a predetermined number of times or until a collision of the current packet does not occur.

4. The method of claim 2, further comprising
when a collision of the current packet does not occur, transmitting thee current packet to the system, and updating the status of the node.

5. The method of claim 1, further comprising:
storing the status of the nodes in memory, the status indicative of the successful transmission of the previous packet from the nodes.

6. The method of claim 1, wherein the status includes a transmit or receive indicator for the previous transmission attempts.

7. The method of claim 1, further comprising:
setting the length of time to a predetermined gap if the status indicates reception after reception;
setting the length of time to the predetermined gap plus a slot time if the status indicates reception after transmission;
setting the length of time to the predetermined gap plus two times the slot time if the status indicates transmission after reception; and
setting the length of time to the predetermined gap plus three times the slot time if the status indicates transmission after transmission.

8. The method of claim 7, wherein the slot time represents a maximum time required for one node to transmit the current packet to another node, and to receive a reply message from the other node.

9. The method of claim 1, wherein the length of time includes an inter packet gap and a backoff period.

10. The method of claim 9, wherein the backoff period is obtained such that an integral multiple number is selected from a plurality of integral multiple numbers between zero and $2^k$, where k is the number of transmission attempts for the current packet up to a predetermined maximum number of transmission attempts.

11. The method of claim 10, after step (a), further comprising:
(d) determining if the status of the node indicative of the successful transmission of a previous packet from the node is different than a new status of the node indicative of a successful transmission of a current packet from the node.

12. The method of claim 11, further comprising
when the status of the node is the same as the new status of the node,
(e) transmitting the current packet to a system after waiting for a backoff period.

13. The method of claim 12, before step (a), further comprising:
(f) detecting whether a collision of the current packet transmitted from the node to the system occurred.

14. The method of claim 13, further comprising:
repeating steps (a–f) up to a predetermined number of times or until a collision of the current packet does not occur.

15. The method of claim 13, further comprising
when a collision of the current packet does not occur, transmitting the current packet to the system, and updating the status of the node.

16. The method of claim 1, wherein the setting of the length of time is determined by a number of successful and failed transmissions of the node.

17. The method of claim 1, wherein the status is determined by a number of times the previous packet is transmitted and received by the node.

18. A method comprising:
(a) detecting whether a collision occurs between transmitted signals during packet transmission in a network having a plurality of nodes; and
when the collision is detected,
(b) reading a success or failed status having two or more bits of a node having the collision,
(c) setting an inter packet gap for the node based on the success or failed status having two or more bits,
(d) after a lapse of the inter packet gap and a backoff time retransmitting a signal from the node having the collision,
(e) detecting whether a collision occurs with the retransmitted signal,
(f) when the collision is not detected with respect to the retransmitted signal, updating the success or failed status of the node having the collision, and
(g) when the collision is detected with respect to said retransmitted signal, repeating steps (b) through (e).

19. The method of claim 17, wherein the inter packet gap is set to a normal gap plus an integral multiple of slot time according to the success or failed status when the collision is detected.

20. The method of claim 19, wherein said slot time is a maximum time required for the node to transmit a packet to another node and receive an answer from the other node based on a size of the network.

21. The method of claim 18, wherein the success or failed status is indicative of a number of successful and failed transmissions of the node.

22. A method comprising:
(a) detecting whether a collision occurs between transmitted signals during packet transmission in a network having a plurality of nodes;
(b) when the collision is not detected, transmitting a signal and updating the node state;
when the collision is detected,
(c) reading a success or failed status having two or more bits of a node having the collision, and
(d) judging whether there is a difference between the success or failed status and a current state of the corresponding node,
(e) when there is no difference, between the success or failed status and the current state, then retransmitting the signal after backoff time, and repeating step (a),
when there is a difference between the success or failed status and current state, then
(f) setting an inter packet gap for the node based on the success or failed status,
(g) after a lapse of the inter packet gap and a backoff time retransmitting the signal from the node having the collision,
(h) detecting whether a collision of the signal retransmitted from the node occurs,
(i) when the collision is not detected with respect to the retransmitted signal, updating the success or failed status of the node having the collision, and (j) when the collision is detected with respect to said retransmitted signal, and if there is no difference between the success or failed status and current state, then repeating step (e).

23. The method of claim 21, wherein the inter packet gap is set to a normal gap plus an integral multiple of a slot time according to the success or failed status.

24. The method of claim 23, wherein said slot time is a maximum time required for the node to transmit a packet to another node and receive an answer from the other node based on a size of the network.

25. The method of claim 22, wherein the success or failed status is indicative of a number of successful and failed transmissions of the node.

26. A device for detecting collisions on a network, comprising:

means for receiving a status of a network node having two or more bits indicative of a successful or failed transmission during at least two previous transmission attempts from the network node;

means for setting a period of time based on success or failed status of the network node having two or more bits; and means for transmitting a current packet to a system after waiting for the period of time.

\* \* \* \* \*